(12) United States Patent
Rivkin

(10) Patent No.: US 9,183,117 B2
(45) Date of Patent: Nov. 10, 2015

(54) METHOD FOR DEVELOPING AND TESTING A CONNECTIVITY DRIVER FOR AN INSTRUMENT

(71) Applicant: Starlims Corporation, Hollywood, FL (US)

(72) Inventor: Slava Rivkin, Ashkelon (IL)

(73) Assignee: Abbott Laboratories Inc., Abbott Park, IL (US)

( * ) Notice: Subject to any disclaimer, the term of this patent is extended or adjusted under 35 U.S.C. 154(b) by 0 days.

(21) Appl. No.: 13/923,094

(22) Filed: Jun. 20, 2013

(65) Prior Publication Data

US 2014/0380284 A1    Dec. 25, 2014

(51) Int. Cl.
  *G06F 9/44*    (2006.01)
  *G06F 11/36*    (2006.01)

(52) U.S. Cl.
  CPC .............. *G06F 11/366* (2013.01); *G06F 8/00* (2013.01); *G06F 8/10* (2013.01); *G06F 11/3668* (2013.01); *G06F 8/20* (2013.01); *G06F 8/30* (2013.01); *G06F 8/34* (2013.01); *G06F 8/36* (2013.01)

(58) Field of Classification Search
  CPC .............. G06F 8/10; G06F 8/20; G06F 8/30; G06F 8/34; G06F 8/36; G06F 11/3664; G06F 11/3688
  See application file for complete search history.

(56) References Cited

U.S. PATENT DOCUMENTS

| | | |
|---|---|---|
| 5,134,701 A | 7/1992 | Mueller et al. |
| 5,870,607 A | 2/1999 | Netzer |
| 5,889,988 A | 3/1999 | Held |
| 5,978,584 A | 11/1999 | Nishibata et al. |
| 6,011,920 A | 1/2000 | Edwards et al. |
| 6,243,833 B1 | 6/2001 | Hitchcock et al. |
| 6,275,956 B1 | 8/2001 | On et al. |
| 6,279,122 B1 | 8/2001 | Hitchcock et al. |
| 7,114,112 B2 | 9/2006 | Griffin et al. |

(Continued)

FOREIGN PATENT DOCUMENTS

EP    1736881 A1    12/2006

OTHER PUBLICATIONS

Jiayong Zhu, "Automating Laboratory Operations by Integrating Laboratory Information Management Systems (LIMS) With Analytical Instruments and Scientific Data Management System (SDMS)", Indiana University, Jun. 2005, pp. 1-78; <https://scholarworks.iupui.edu/bitstream/.../Thesis_Jay%20Zhu_Final.pdf>.*

(Continued)

*Primary Examiner* — Thuy Dao
*Assistant Examiner* — Ben C Wang
(74) *Attorney, Agent, or Firm* — Beth A. Vrioni

(57) ABSTRACT

A computer readable memory medium comprising program instructions for developing and testing a connectivity driver for an instrument is provided. The program instructions are executable by a processor to record transmissions to or from the instrument, place raw data from each recorded transmission into a primary field, and generate a secondary field associated with the primary field. The secondary field includes at least one of: a time that the transmission was transmitted at, a direction the transmission was transmitted in, a content of the transmission, and a state of the connectivity driver during the transmission. The program instructions are also executable by a processor to modify the content of the first or secondary fields, and play the modified transmission from computer readable memory medium in order to debug the communications software.

20 Claims, 14 Drawing Sheets

(56) References Cited

U.S. PATENT DOCUMENTS

| | | | |
|---|---|---|---|
| 7,167,820 B2 | 1/2007 | Sarfati et al. | |
| 7,213,230 B2 | 5/2007 | Harel et al. | |
| 7,216,341 B2 | 5/2007 | Guarraci | |
| 7,506,318 B1 | 3/2009 | Lindo et al. | |
| 7,584,019 B2* | 9/2009 | Feingold et al. | 700/245 |
| 7,680,958 B2 | 3/2010 | Noonan et al. | |
| 8,117,625 B2 | 2/2012 | Needamangala et al. | |
| 8,141,052 B2 | 3/2012 | Guarraci | |
| 8,181,158 B2 | 5/2012 | Lev et al. | |
| 8,572,556 B2* | 10/2013 | Rivkin | 717/106 |
| 2005/0166094 A1* | 7/2005 | Blackwell et al. | 714/38 |
| 2006/0148063 A1* | 7/2006 | Fauzzi et al. | 435/286.4 |
| 2006/0212540 A1* | 9/2006 | Chon et al. | 709/218 |
| 2006/0259542 A1* | 11/2006 | Wu et al. | 709/202 |
| 2007/0234293 A1* | 10/2007 | Noller et al. | 717/124 |
| 2007/0234300 A1* | 10/2007 | Leake et al. | 717/124 |
| 2008/0097961 A1* | 4/2008 | Dias et al. | 707/2 |
| 2008/0183514 A1* | 7/2008 | Moulckers et al. | 705/7 |
| 2008/0235055 A1* | 9/2008 | Mattingly et al. | 705/3 |
| 2009/0320002 A1 | 12/2009 | Peri-Glass et al. | |
| 2010/0005342 A1 | 1/2010 | Dambra et al. | |
| 2010/0153924 A1 | 6/2010 | Andrews | |
| 2011/0078666 A1 | 3/2011 | Altekar | |
| 2012/0011491 A1 | 1/2012 | Eldar | |
| 2012/0096441 A1 | 4/2012 | Law et al. | |
| 2012/0124556 A1 | 5/2012 | Tong | |
| 2012/0174060 A1* | 7/2012 | Rivkin | 717/105 |
| 2012/0221519 A1* | 8/2012 | Papadomanolakis et al. | 707/615 |
| 2013/0145046 A1* | 6/2013 | Rivkin | 709/246 |

OTHER PUBLICATIONS

Vishwanath et al., "Swing: Realistic and Responsive Network Traffic Generation", 2009 IEEE, vol. 17, No. 3, Jun. 2009, pp. 712-725; <http://ieeexplore.ieee.org/stamp/stamp.jsp?tp=&arnumber=4914755>.*

Basu et al., "Karma: Scalable Deterministic Record-Replay", ACM, ICS'11, May 31-Jun. 4, 2011, Tucson, Arizona, USA, pp. 359-368; <http://d1.acm.org/results.cfm?h=1&cfid=525099322&cftoken=43339598>.*

Buchanan, E.B. and Buchanan, M.L., "Laboratory microcomputer system for the development of microcomputer-controlled analytical instrumentation," Talanta, vol. 27, Issue 11, Supplement 2, pp. 947-954, Nov. 1980.

Burgess, P. et al., "Debugging and Dynamic Modification of Embedded Systems," Proceedings of the 29th Annual Hawaii International Conference on System Sciences, vol. 1, pp. 489-498, Jan. 3-6, 1996.

Ghosh, A. et al., "A hardware-software co-simulator for embedded system design and debugging," Proceedings of the 1995 Asia and South Pacific Design Automation Conference, Article No. 25, pp. 155-164, Aug. 29-Sep. 1, 1995.

King, S.T. et al., "Debugging operating systems with time-traveling virtual machines," Proceedings of the annual conference on USENIX Annual Technical Conference, pp. 1-15, 2002.

Kranzlmüller, D., "Event Graph Analysis for Debugging Massively Parallel Programs," pp. 344, Sep. 2000.

Lee, D. et al., "Offline symbolic analysis for multi-processor execution replay," 42nd Annual IEEE/ACM International Symposium on Microarchitecture, 2009. MICRO-42, pp. 564-575, Dec. 12-16, 2009.

Liu, H. et al., "XenLR: Xen-based Logging for Deterministic Replay," Japan-China Joint Workshop on Frontier of Computer Science and Technology, 2008. FCST '08, pp. 149-154, Dec. 27-28, 2008.

Thane, H. et al., "Replay Debugging of Real-Time Systems Using Time Machines," Proceedings of the International Parallel and Distributed Processing Symposium, pp. 8, Apr. 22-26, 2003.

Xue, R. et al., "MPIWIZ: Subgroup reproducible replay of MPI applications," ACM SIGPLAN Notices, vol. 44, No. 4, pp. 251-260, Nov. 10, 2009.

International Search Report and Written Opinion for PCT/US2014/43430 dated Sep. 2, 2014, 11 pages.

* cited by examiner

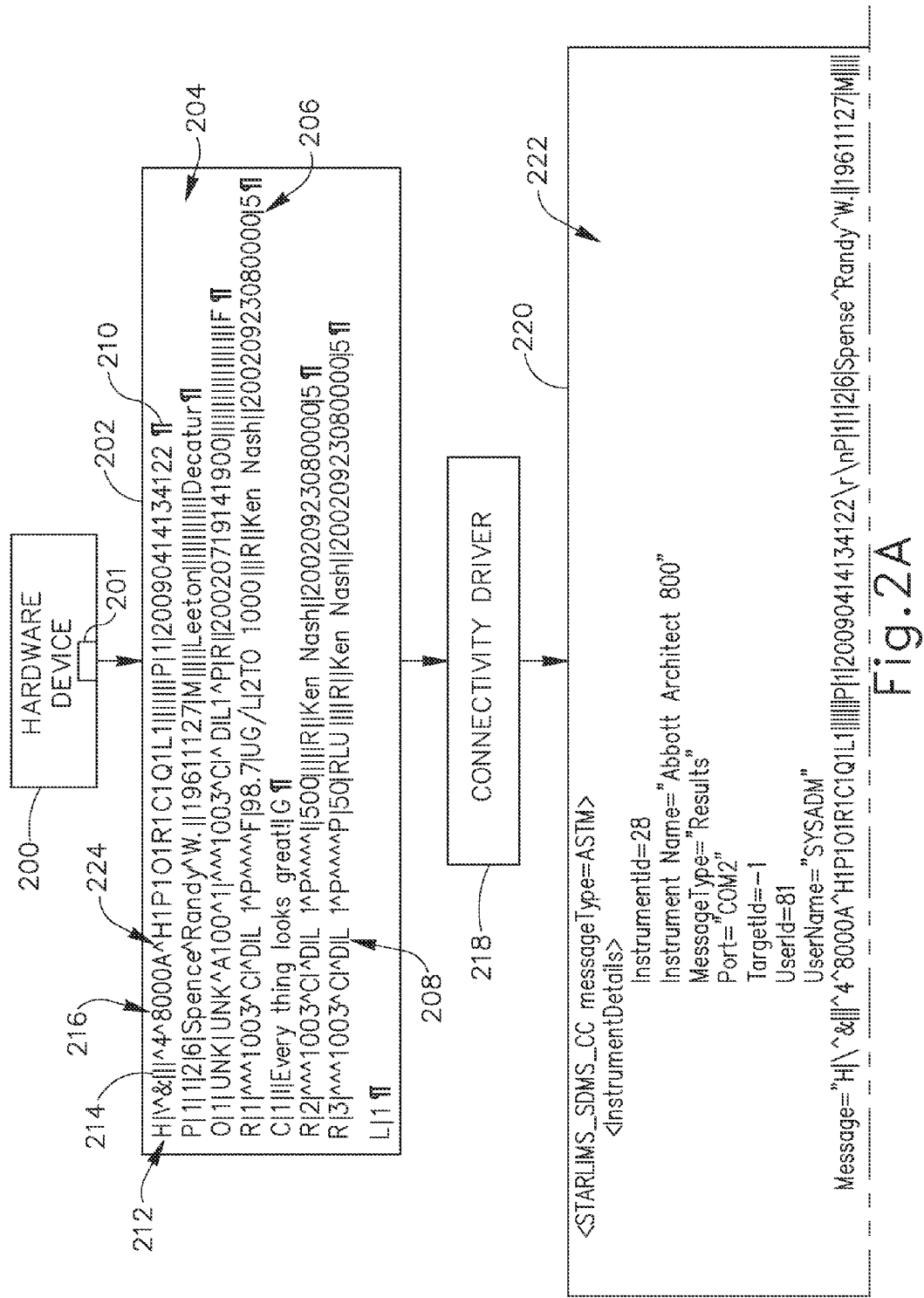

```
Leeton|||||||||Decatur|r|n|0||UNK|UNK^A100^1|^^^1003^Cl^DIL1^P|R|20020719141900||||||||F|\r\nR|1|^^^1003^Cl^DIL1^P^^^^|9
8.7|UG/L|2 to 1000|||||R||Ken Nash||20020923080000|5\r\nR|2|^^^1003^Cl^DIL1^P^^^^|500|||||R||Ken
Nash||20020923080000|5\r\nR|3|^^^1003^Cl^DIL1^P^^^^|50|R|L|||R||Ken Nash||20020923080000|5\r\nL|1"
    </InstrumentDetails>
    <TransmisionDetails>
        <ColLevel1>
            <Content message="H position=0 field="header"/>
            <ColLevel2>
                <Content message=""^&" position=1 field="init"/>
                <Content message=""""4^800A^H1P10|R1C1Q1L1" position=4 field="deviceId"/>
                <Content message="P position=11 field=""/>
                <Content message="1" position=12 field=""/>
                <Content message="20090414134122" position13 field=""/>
            </ColLevel2>
            <Content message="p" position=1 field="patientDetails"/>
            <ColLevel2>
                <Content message="1" position=1 field=""/>
                <Content message="1" position=2 field=""/>
                <Content message="2" position=3 field=""/>
                <Content message="6" position=4 field=""/>
                <Content message="P" position=5 field=""/>
                <Content message="Spence^Randy^W." position=6 field="name"/>
                <Content message="19611127" position=8 field=""/>
```

Fig.2B

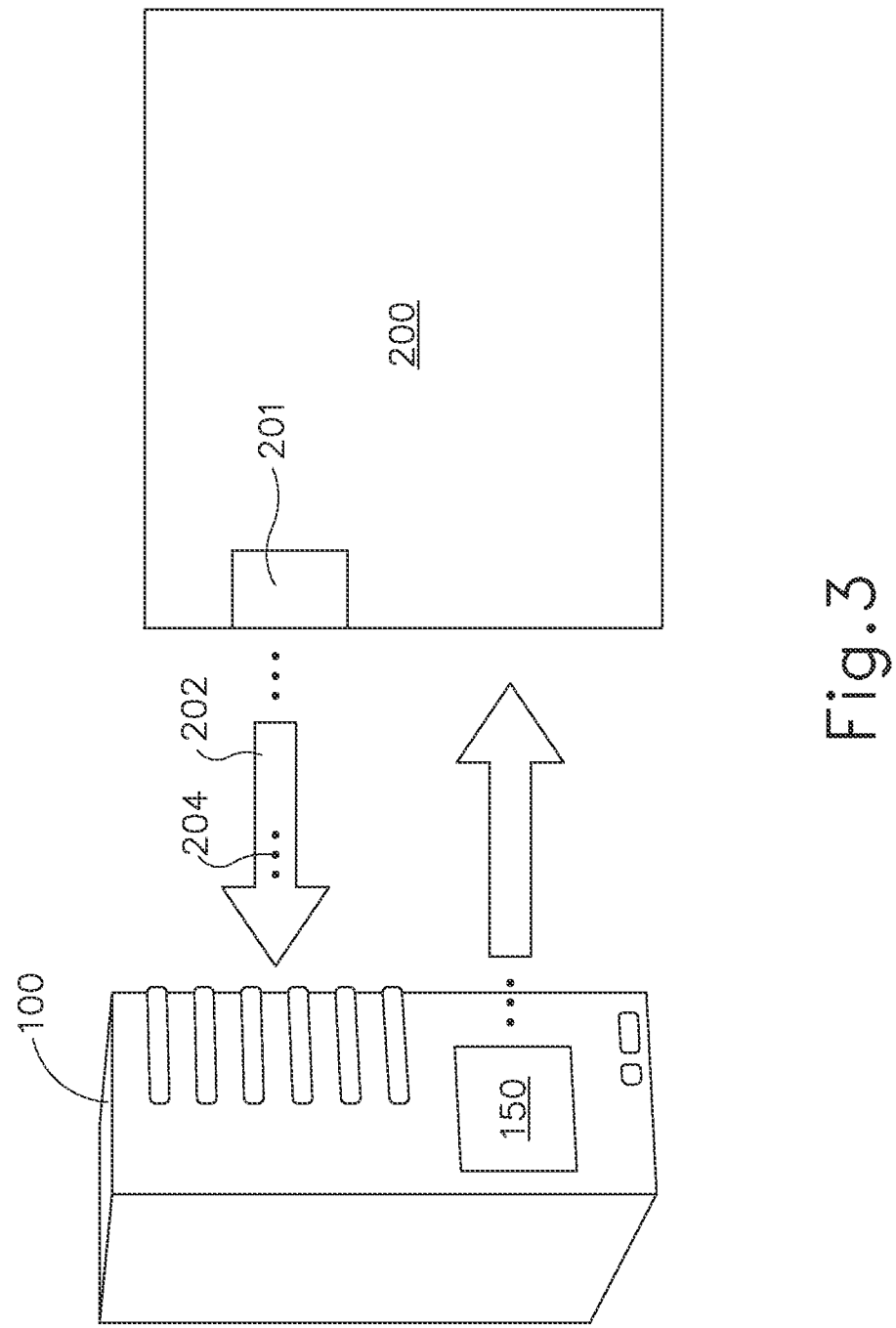

METHOD FOR DEVELOPING AND TESTING A CONNECTIVITY DRIVER FOR AN INSTRUMENT

BACKGROUND

Unless otherwise indicated herein, the materials described in this section are not prior art to the claims in this application and are not admitted to be prior art by inclusion in this section.

A Laboratory Information Management System or Laboratory Integration Management Solution (LIMS) is a software system used in laboratories for the integration of laboratory software and instruments and the management of samples, laboratory users, standards and other laboratory functions such as Quality Assurance (QA) and Quality Control (QC), sample planning, invoicing, plate management, and workflow automation. LIMS implementations may also support information gathering, decision making, calculation, review and release into the workplace and away from the office. More recently, LIMS products are starting to expand into Electronic Laboratory Notebooks, assay data management, data mining and data analysis.

One core function of LIMS is the management of samples. This typically is initiated when a sample is received in the laboratory at which point the sample will be registered in the LIMS. This registration process may involve accessioning the sample and producing barcodes to affix to the sample container. Various other parameters may be recorded as well, such as clinical or phenotypic information corresponding with the sample. The LIMS may then track chain of custody of the sample as well as the sample location. Location tracking often involves assigning the sample to a particular location such as a shelf/rack/box/row/column. Other event tracking may be required such as freeze and thaw cycles that a sample undergoes in the laboratory.

Modern LIMS have implemented extensive configurability as each laboratories needs for tracking additional data points can vary widely. LIMS vendors often cannot make assumptions about what these data tracking needs are and therefore need to be adaptable to each environment. LIMS users may also have regulatory concerns to comply with such as CLIA, HIPAA, GLP and FDA specifications and this can affect certain aspects of sample management in a LIMS solution. One key to compliance with many of these standards is audit logging of all changes to LIMS data, and in some cases a full electronic signature system is required for rigorous tracking of field level changes to LIMS data.

One may configure a LIMS whereby users are assigned roles or groups. Typically the role of a user will dictate their access to specific data records in the LIMS. Each user account is protected by security mechanisms such as a user id and a password. Users may have customized interfaces based on their role in the organization. For example, a laboratory manager might have full access to all of a LIMS functions and data, whereas technicians might have access only to data and functionality needed for their individual work-tasks.

Some LIMS offer some capability for integration with instruments. A LIMS may create control files that are "fed" into the instrument and direct its operation on some physical item such as a sample tube or sample plate. The LIMS may then import instrument results files to extract QC or results data for assessment of the operation on the sample or samples. Data owners may access the resulting stored information at any time.

In order to communicate between the LIMS and an instrument, a device driver, also known as a connectivity driver, may be used. A connectivity driver is a computer program allowing a higher-level computer program, such as the LIMS, to interact with a hardware device, such as an instrument. A connectivity driver typically communicates with the hardware device through a system bus of a computer or a communications device connected with the computer, such as a radio or a network interface to which the hardware device connects. When a higher-level computer program invokes a routine in the connectivity driver, the connectivity driver issues commands to the hardware device. If the hardware device sends data back to the connectivity driver, the connectivity driver may invoke routines in the higher-level computer program and may translate and transfer information received by the hardware device into a format which can be read and used by the higher-level computer program. Connectivity drivers are often hardware-dependent and specific to the higher-level computer program. Connectivity drivers also usually provide interrupt handling required for any necessary asynchronous time-dependent interface between the hardware device and the higher-level computer program.

When developing a connectivity driver for a LIMS, a user typically has to write program code for a computer program from which the connectivity driver is executed for each hardware device for which the LIMS wishes to communicate and interact with. The task of writing program code for a connectivity driver is often laborious and requires many hours of work from a trained computer programmer to complete. Writing program code for a connectivity driver also requires an in-depth understanding of how the hardware device and the higher-level computer program function. Typically, the user of a LIMS does not have the type of training and skills needed to write the program code needed from which the connectivity driver is executed. Thus the task of writing program code for a connectivity driver usually falls to a software engineer.

When developing and building a connectivity driver, the software engineer, or person building the driver, needs to test the connectivity driver to see if it works and can successfully communicate between the LIMS and an instrument, with little or no errors being generated. The testing process, also known as debugging, is a methodical process of finding and reducing the number of bugs, or defects, in a computer program or a piece of electronic hardware, thus making it behave as expected. Typically, in order to do debug a connectivity driver, the connectivity driver needs to be in communication with both the LIMS and the instrument for which the connectivity driver is designed to interface with. Since these types of instruments are often found in a laboratory environment, and are rather expensive to use, the time available for the software engineer to debug the connectivity driver is rather limited. As a result, either the instrument for which the connectivity driver was designed to interface with needs to be offline for a substantial amount of time, which may cost the laboratory to incur losses in revenue, or the software engineer may need to debug the connectivity driver in a short amount of time, which may lead to not all of the "bugs," or defects, within the connectivity driver to be found or fixed.

It would be desirable to provide a simplified method for developing and building connectivity drivers which allows for a complete debugging of the connectivity driver without having to take an instrument offline for a substantial amount of time.

SUMMARY

In one aspect, a computer readable memory medium comprising program instructions for developing and testing a connectivity driver for an instrument is provided. The program instructions are executable by a processor to record transmissions to or from the instrument, place raw data from each recorded transmission into a primary field, and generate a secondary field associated with the primary field. The secondary field includes at least one of: a time that the transmission was transmitted at, a direction the transmission was transmitted in, a content of the transmission, and a state of the connectivity driver during the transmission. The program instructions are also executable by a processor to modify the content of the first or secondary fields, and play the modified transmission from computer readable memory medium in order to debug the communications software.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation. The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

FIGS. 2A, 2B, and 2C depict an illustration of a connectivity driver receiving a hardware message from a hardware device and converting the hardware message into software data, in accordance with one embodiment of the present invention.

FIG. 3 depicts a hardware device communicating with a computer, in accordance with one embodiment of the present invention.

DETAILED DESCRIPTION

The present invention makes use of the discovery that by providing a user with software which can record fully reproducible communication traces or portions of communications, which include all communication data including timing and the exact state of a communications driver (FSM). The present invention can also use recorded communications to reproduce actual communications allowing development, debugging, performance measurement, testing and validations—without using the device which originated the communication.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1:
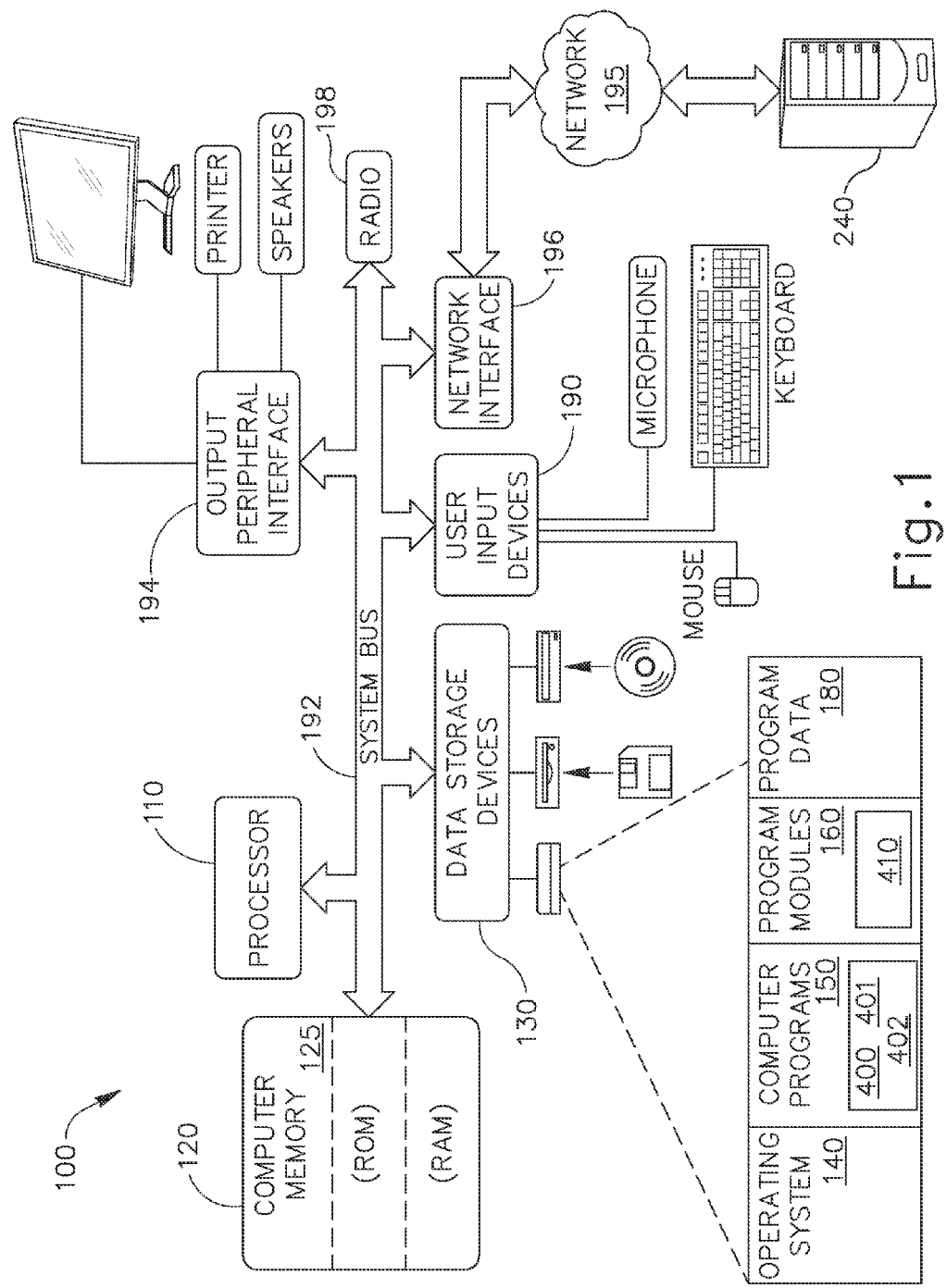
FIG. 1 depicts a block schematic diagram of an exemplary computing system, in accordance with one embodiment of the present invention.
Figure 2C:
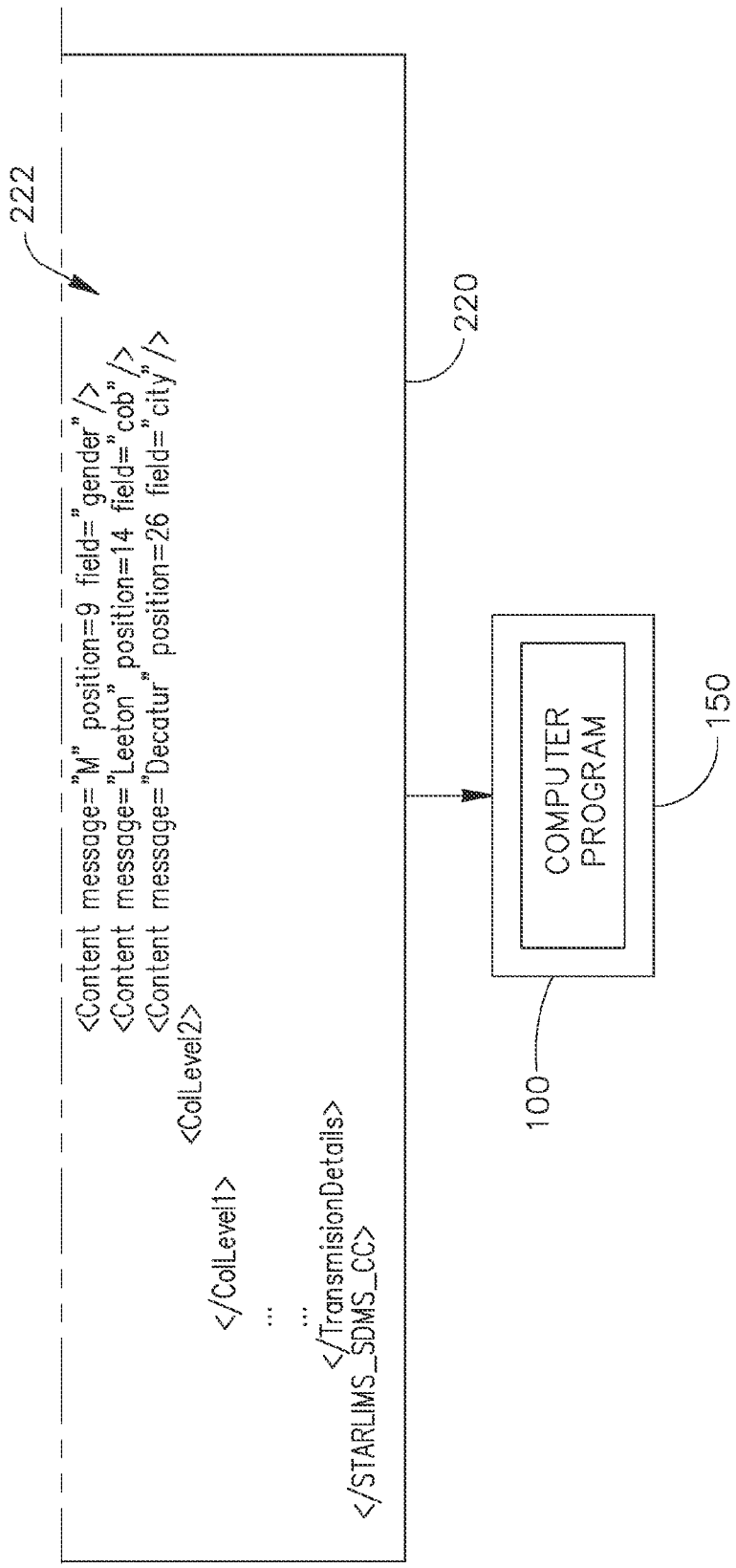

With reference to FIG. 1, depicted is an exemplary computing system for implementing embodiments. FIG. 1 includes computer 100 running a computer program, such as a LIMS software application 400, a laboratory information system (LIS) software application 401, or a middleware program 402. The LIMS software 400 is a software system used in laboratories for the integration of laboratory software and instruments and the management of samples, laboratory users, standards and other laboratory functions such as Quality Assurance (QA) and Quality Control (QC), sample planning, invoicing, plate management, and workflow automation. The LIS software application 401 is a class of software that receives, processes, and stores information generated by medical laboratory processes. The LIS software application 401 often must interface with instruments and other information systems such as hospital information systems (HIS). The LIS software application 401 is a highly configurable application which is customized to facilitate a wide variety of laboratory workflow models. A middleware program 402 is a piece of software that operates between a first computer program, such as a LIMS software application 400 or a LIS software application 401, and a hardware device 200.

The computer 100 includes a processor 110 in communication with a computer readable memory medium 120. Computer readable memory medium 120 is any medium which can be used to store information which can later be accessed by processor 110. Computer readable memory medium 120 includes computer memory 125 and data storage devices 130. Computer memory 120 is preferably a fast-access memory and is used to run program instructions executable by the processor 110. Computer memory 120 includes random access memory (RAM), flash memory, and read only memory (ROM). Data storage devices 130 are preferably physical devices and are used to store any information or computer program which may be accessed by the processor 110, such as an operating system 140, computer programs 150 such as LIMS software application 400, program modules 160 such as a driver development module 410 which runs as a part of LIMS software application 400, and program data 180. Data storage devices 130 and their associated computer readable memory medium provide storage of computer readable instructions, data structures, program modules and other data for the computer 100. Data storage devices 130 include magnetic medium like a floppy disk, a hard disk drive, and magnetic tape; an optical medium like a Compact Disc (CD), a Digital Video Disk (DVD), and a Blu-ray Disc; and solid state memory such as random access memory (RAM), flash memory, and read only memory (ROM).

Computer 100 further includes input devices 190 through which data may enter the computer 100, either automatically or by a user who enters commands and data. Input devices 190 can include an electronic digitizer, a flatbed scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, an instrument, a sensor, and the like. In one or more embodiments, input devices 190 are portable devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, printers, and/or display devices, which may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment 195 using logical connections to one or more remote computers, such as a remote server 240. The remote server 240 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN or WLAN through a network interface 196 or an adapter. When used in a WAN networking environment, computer 100 may include a modem or other means for establishing communications over the WAN, such as radio 198, to environments such as the Internet or to another remote computer. It will be appreciated that other means of establishing a communications link between computer 100 and other remote computers may be used.

In one embodiment, computer 100 is in communication with remote server 240, and the LIMS software application 400 is run on the remote server 240, receiving commands and information from the computer 100 being input by a user. Information from the LIMS software application 400 running on the remote server 240 is displayed on a display connected with the computer 100.

With reference to FIG. 3, a hardware device 200 generates a hardware message 202 which is communicated to a computer program 150 residing on computer 100 or a computer program 150 residing on remote server 240. The hardware device 200 is any piece of electronic hardware having a communications interface 201, such as a radio 198, a network interface 196, or an output peripheral interface 194 which can communicate with an interface with another 192 piece of electronic hardware, also having a communications interface. Preferably, hardware device 200 is any instrument, computer, or piece of electronic hardware found in a laboratory which can transmit and output the hardware message 202 to another instrument, computer 100, or piece of electronic hardware. In one embodiment, hardware device 200 is, or is connected with, a laboratory instrument for use in a clinical laboratory, which many be used to analyze mammalian biological samples.

With reference to FIGS. 2A, 2B, 2C, and 3, hardware device 200 generates and outputs a transmission, such as hardware message 202, via communications interface 201. Hardware message 202 may be encoded or formatted in many different ways and hardware protocols 203, like Extensible Markup Language (XML), or position-based fields. In one embodiment, messages are encoded using a hardware protocol 203 used to encode discrete fields 208 of data using delimiters 206 for demarking the boundary of a discrete field 208 within the hardware message 202. Protocol 203 can be any standard on non-standard protocol used to encode information by a hardware device, such as Health Level Seven International (HL7) American Society for Testing and Materials (ASTM), File buffers, or other custom protocols defined by a manufacturer of a hardware device 200. Delimiters 206 can be any type of textual character, symbols, binary structures, position information, or mark and includes such characters as: "~", "|", "\", "[", "]", "^", and a carriage return character, for example. Instead of relying on a specific character or symbol, position information relies on a specific position within the hardware message 202 to delimit the hardware message 202. Additionally, mark relies on a demarcation within the hardware message 202, such as an end-of-line indicator or section break, to delimit the hardware message 202.

In one embodiment, the hardware message 202 includes record delimiters 210, field delimiters 214, and bracket delimiters 224. Field delimiters 214 separate discrete data fields 216 and record delimiters 210 separate groups of discrete data fields 216 known as a discrete record field 212. For example, a comma-separated values (CSV) file format uses a comma as a field delimiter 214 between discrete data fields 216, and an end-of-line indicator, or paragraph mark, as a record delimiter 210 between discrete record fields 212. Bracket delimiters 224, also known as block delimiters, region delimiters or balanced delimiters, mark both the start and end of a discrete region of text 226 within discrete data fields 216. For example, discrete data fields 216 may include information such as a Patient's Name, wherein the first, last and middle names of the patient may be separated using a bracket delimiter 224.

Upon outputting the hardware message 202 via communications interface 201, the hardware message 202 is received by a connectivity driver 218, having a parsing sequence for analyzing and converting the hardware message 202 sent using the hardware protocol 203 into software data 220 having a file format 222 readable by computer program 150, wherein the entire parsing sequence defines a hardware grammar used to encode and decode discrete fields 208 into and from the hardware message 202. The connectivity driver 218 also uses the parsing sequence for analyzing and converting the software data 220 having the file format 222 into the hardware message 202 sent using hardware protocol 203, which is readable by hardware device 200. The connectivity driver 218 serves to essentially translate hardware messages 202 into software data 220 and software data 220 into hardware messages 202, so that the hardware device 200 can communicate with the computer program 150 within computer 100 or remote server 240, and so that the computer program 150 can communicate with the hardware device 200. Software data 220 may use any file format 222 readable by computer program 150, such as XML.

With reference to FIG. 7, shown is a diagrammatic representation of a system 300 for recording a transmission 298, such as a hardware message 202 using a hardware protocol 203, sent from an instrument 304, 306, or 308 or another component in system 300, such as an Scientific Data Management System (SDMS) server 312 or a Lab Information Management Systems (LIMS) server 314, to a replay generator 310, which records the transmission 298. The hardware protocol 203 may include any type of data, including raw data sent over an RS232 interface and Native TCP/IP or Non-Native TCP/IP packets.

Figure 7A:
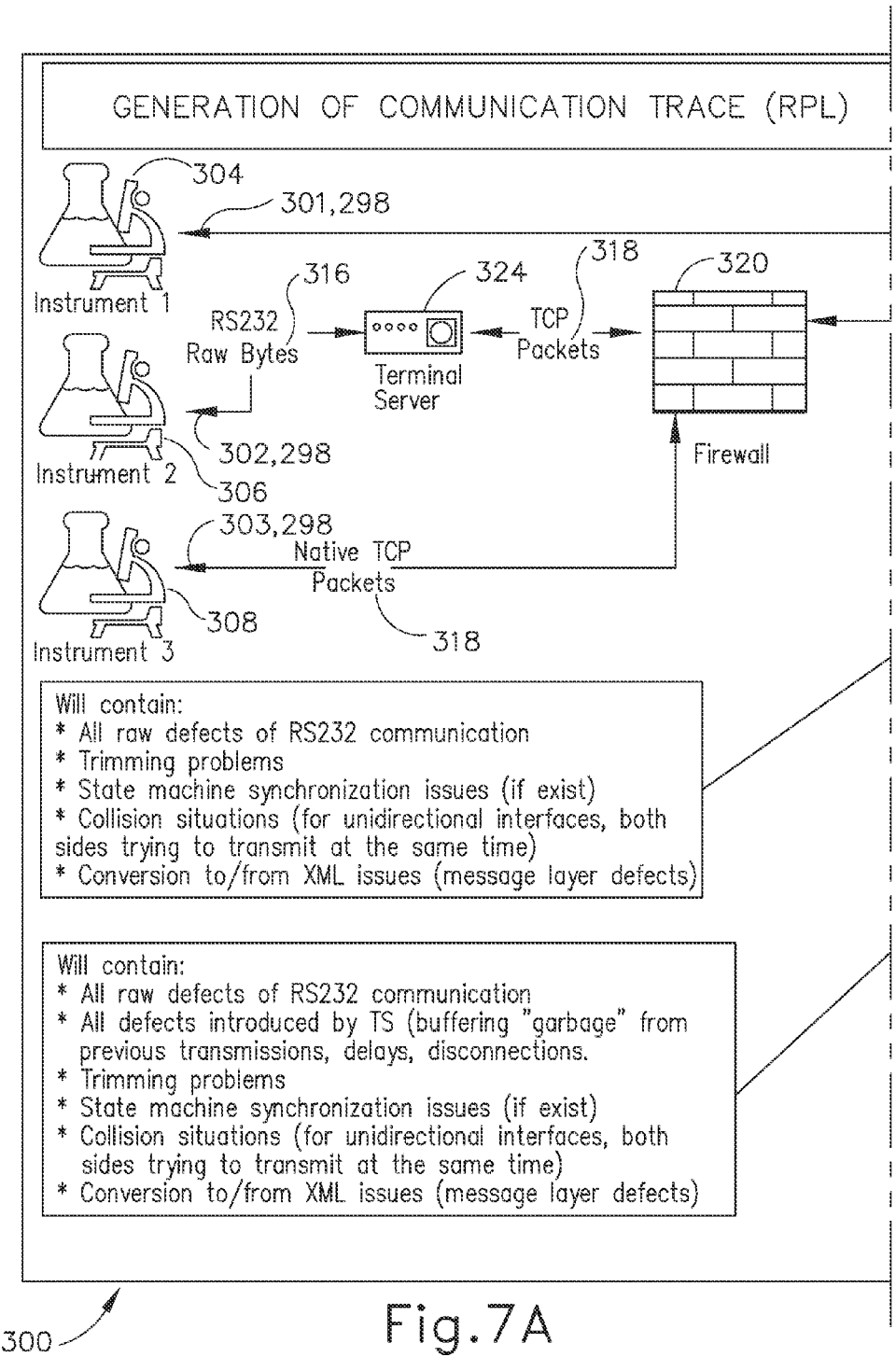
FIGS. 7A and 7B depict a connection diagram of various components of the system, configured to record communication data traces, driver state statuses (FSM, and others), and other information relevant for communication reproduction, in accordance with one embodiment of the present invention.
Figure 7B:
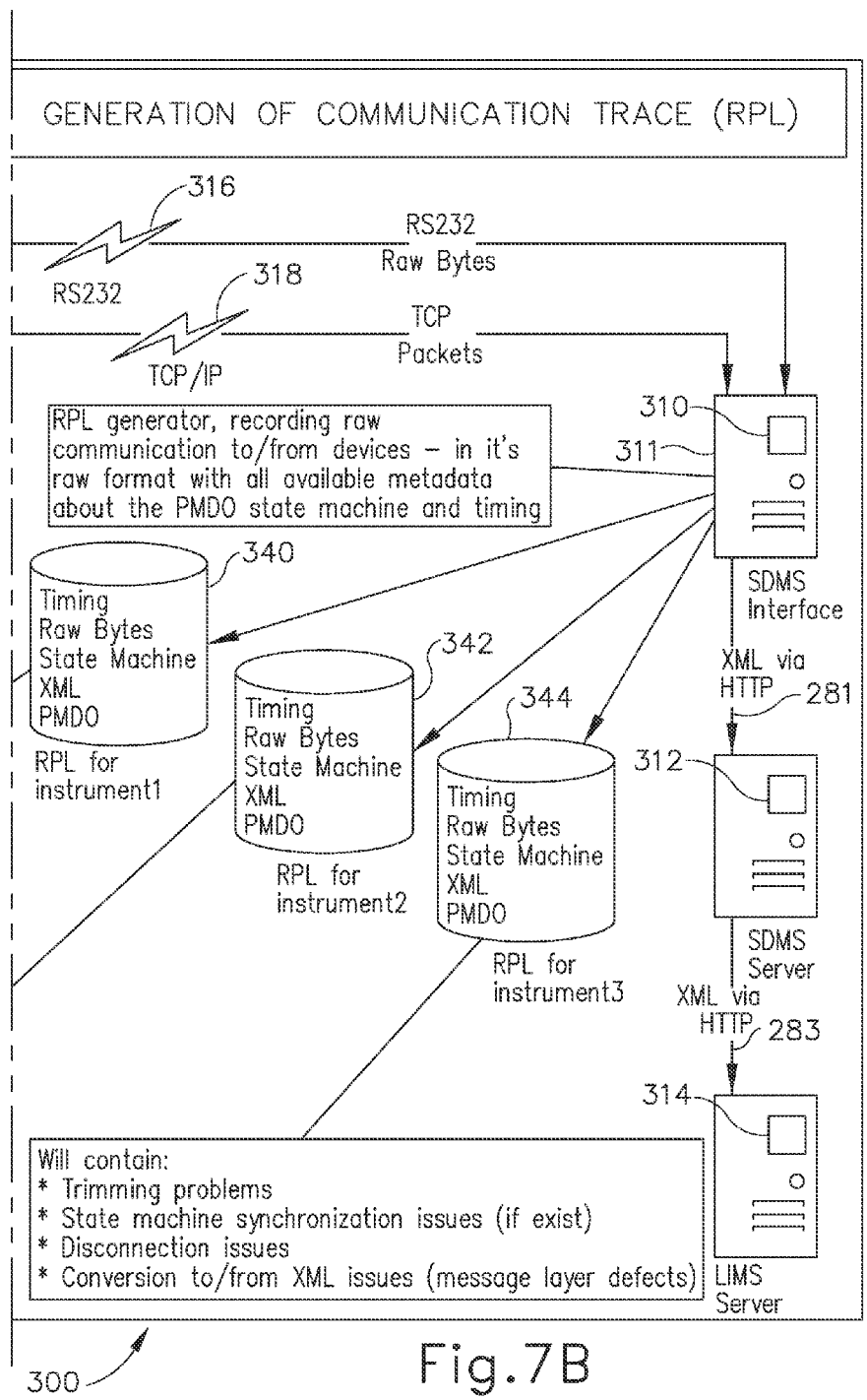

In one example, first instrument 304 sends a first transmission 301 including a hardware message 202 using a hardware protocol 203 that includes raw data over an RS232 interface directly to a replay generator 310. Second instrument 306 sends a second transmission 302 including a hardware message 202 using a hardware protocol 203 that includes raw data over an RS232 interface to a terminal sever 324, which then translates the raw data into TCP/IP packets 318 which are then transmitted through a firewall 320 and then to replay generator 310. Third instrument 308 sends a third transmission 303 including native TCP/IP packets 318 to the firewall 320, and which screens the TCP/IP packets 318 and allows them through the firewall 320 assuming the TCP/IP packets 318 meet predetermined criteria. The TCP/IP packets 318 are then transmitted to the replay generator 310. While three instrument configurations are shown in FIGS. 7A and 7B, countless number of instrument configurations including a variety of instruments sending hardware messages 202, using a variety of hardware protocols 203, and being sent through a variety of intermediaries, such as terminal server 324, firewall 320, the internet, a local network, a router, a switch, and an intermediate computer, may be possible. Additionally, SDMS server 312 may send a message 281 generated by a connectivity driver 218, for example, to an instrument 304, 306, or 308, which gets routed through the replay generator 310. Additionally, LIMS server 314 may send a message 283, such as a LIMS message generated by a LIMS message handler, for example, to an instrument 304, 306, or 308, which gets routed through the replay generator 310. While just an SDMS server 312 and a LIMS server 314 are discussed, any computer connected with an instrument and any transmission which is generated and sent to an instrument, may be substituted.

With reference to FIG. 8, as each transmission 298 is received at the replay generator 310, the replay generator 310 records a captured transmission 299 having discrete fields 326 of information 328. The discrete fields 326 of information 328 include captured RAW data, such as the raw bytes of data or content of each transmission 298, and generated data, which is generated upon receiving the transmission 298. Generated data includes the time that each transmission 298 was transmitted at or received, the direction that the transmission 298 was transmitted in (i.e. from the instrument 304, 306, 308 to the replay generator 310 or vice versa), the state of the connectivity driver 218 (Preservation Metadata for Digital Objects (PMDO) information) at the time the transmission 298 is received by the replay generator 310, any parsed data, such as XML information found in the transmission 298.

The replay generator 310 is preferably a piece of software run on hardware, such as a computer, such as an SDMS interface 311. Preferably, the replay generator 310 consists of a combination of hardware and software which can receive and record transmissions 298, and in particular, the packets or bytes of data in each transmission 298, and generate the discrete fields 326 of information 328. Preferably, the replay generator 310 is connected with each instrument 304, 306, 308 in a laboratory. Preferably, the replay generator 310 is also connected with other computers which are also in connected with each instrument 304, 306, 308, such as an SDMS server 312, and a LIMS server 314. Preferably, the replay generator 310 sits in between each instrument 304, 306, 308 and the SDMS server 312 and the LIMS server 314, and receives and can record transmissions 298 being sent to and from each of these components. Transmissions 298 include transmissions 301 between the replay generator 310 and instrument 304, transmissions 302 between the replay generator 310 and instrument 306, transmissions 303 between the replay generator 310 and instrument 308, transmissions 281 between the replay generator 310 and the SDMS server 312, and transmissions 283 generated or received by the LIMS server 314, for example.

Preferably, as each packet, or even each byte, of data in a transmission 298, such as transmission 301, is received at the replay generator 310, discrete fields 326 of information 328 are generated for each packet, or even each byte, of data in a transmission. For example, as packets of data in a transmission 298 are received the replay generator 310, a timestamp 510 representing the time that the packet of data was received is generated and put in a discrete field 326, and the content of the packet of data is placed in another discrete field 326 and associated with the timestamp. In addition to the timestamp, for a transmission 301, 302, or 303 from the SDMS server 312 to instrument 304, 306, 308, the current state 512 of the connectivity driver 218, which is being used to communicate between the LIMS software application 400 run on the remote server 240 (also known as the LIMS server 314) and an instrument 304, 306, or 308, may be recorded and put in a discrete field 326. Any information 328 can be recorded in a discrete field 326 and associated with the transmission 298 or packets or bytes of data within the transmission 298. The discrete fields 326 of information 328 provide much needed insight into the transmission 298, such as the time each byte of data is received, or the exact state the connectivity driver 218, which is extremely useful when trying to replay or modify the transmission 298 in a simulated environment order to accurately simulate the transmission 298 to or from an instrument 304, 306, or 308.

Preferably, the data or content of each transmission 298 is recorded in RAW, so that all of the defects in the transmission 298 can be stored and then replayed. For example, if the transmission 298 suffers any degradation or delay from the time it leaves an instrument 304, 306, 308, or server 312, 314, and then travels through a variety of intermediaries, the degradation or delay would be recorded as well. Preferably, the replay generator 310 is programmed to capture the RAW transmission 298, generating a captured RAW transmission 299 with many or all of the defects found in the RAW transmission 298, so that when the captured RAW transmission 299 is played back in a simulated environment order to accurately simulate the RAW transmission 298 from an instrument 304, 306, or 308, the simulation is as accurate as possible. Preferably, the following information is found in or ascertainable from the captured RAW transmission 299: many or all of the RAW defects found in the transmission 298, such as timing problems found in the RAW transmission 298, as the timing of each byte or packet of data is recorded; state machine synchronization issues, if any, as the current state of the connectivity driver 218 is recorded as each byte or packet of data is recorded; collision situations for unidirectional interfaces, since the direction of communication is recorded and if simultaneous communication between the connectivity driver 218 and the instrument 304 is attempted, this would also be recorded; and any conversion issues when converting to or from a software protocol (such as XML), also known as message layer defects; any defects introduced via buffering, transmission delays, and disconnections would be evident.

Preferably, the replay generator 310 is connected via an interface to other computers or servers, such as an SDMS Server 312 which contains the connectivity driver 218, and the LIMS server 314 which generates LIMS messages. Preferably, the replay generator 310 and receives and records transmissions from one or both of the LIMS server 314 and the SDMS server 312, such as transmissions 281 from the connectivity driver 218 and transmission 283 from the LIMS server 314. As each transmission 311, 313 is received at the replay generator 310, the replay generator 310 records a captured transmission for each having discrete fields 326 of information 328. The discrete fields 326 of information 328 include captured RAW data and generated data, as described above.

With reference to FIGS. 7A and 7B, in one example, transmissions 301, 302, or 303, such as RS232 data 316 or TCP/IP packets of data 318, arrive from instruments 304, 306, or 308, respectively, the replay generator 310 records those transmissions 301, 302, 303 as recorded transmissions having replay (RPL) data 340, 342, or 344 for instrument 304, 306, or 308, respectively. The replay data 340, 342, or 344 includes discrete fields 326 of information 328 associated with the data or content of each transmission 301, 302, 303, respectively.

In one embodiment, once the transmission 298 is captured, discrete fields 326 of information 328 may include generated data which has parsed data generated from the RAW data in the captured transmission 299. The parsed data is obtained by parsing the RAW data in the captured transmission 299, and creating discrete fields 250 of data, such as XML data 514. The parsed data may be generated for each portion of data in the transmission 301, such as each packet or even each byte of data in the transmission 301. The parsed data makes it easier for a programmer to decode what the RAW data means. The discrete fields 250 may include a portion of data in the transmission 301 along with corresponding generated information, obtained via parsing and representing what each field means, such as XML data.

Figure 8A:
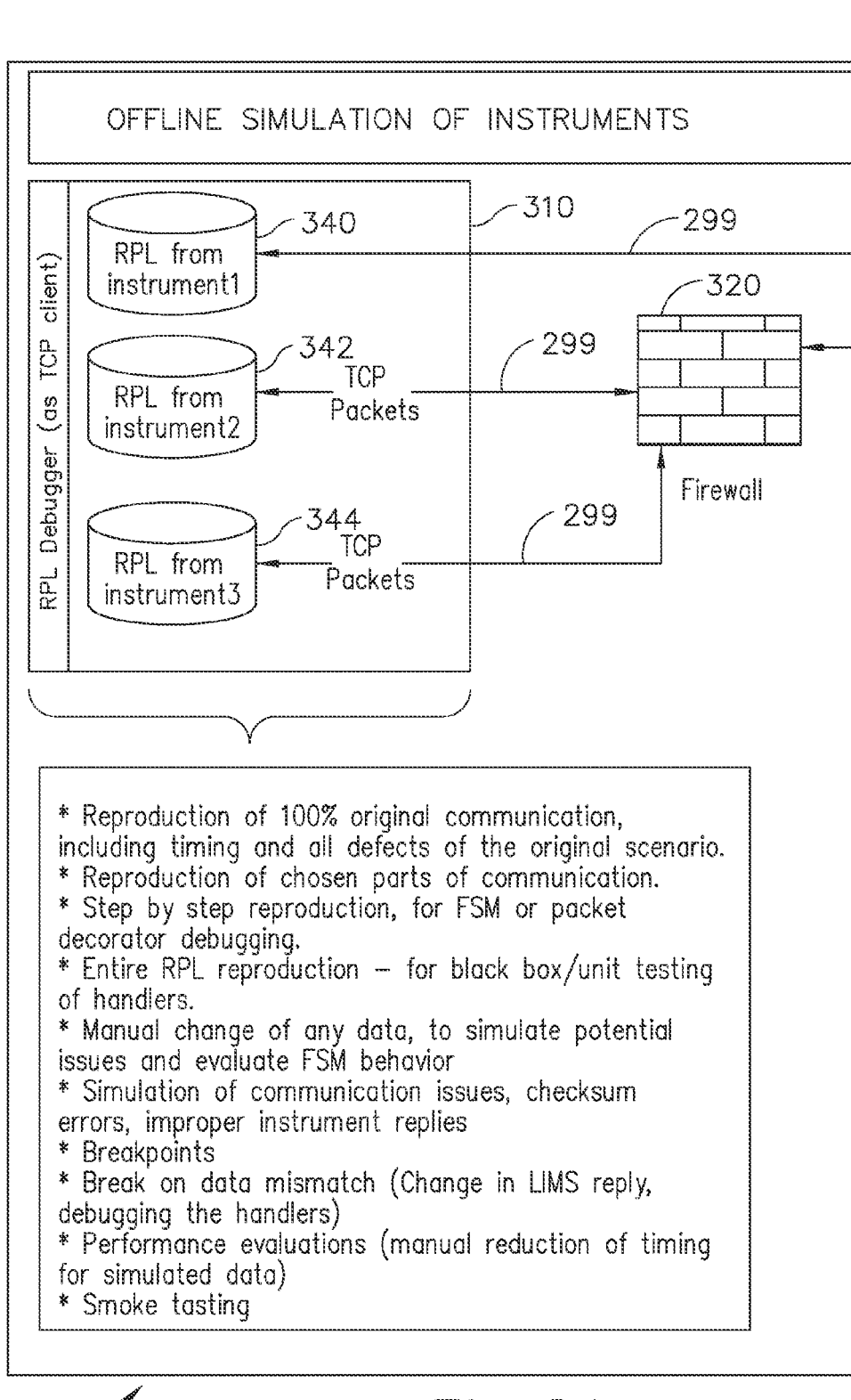
FIGS. 8A and 8B depict a connection diagram of various components of the system, configured to reproduce communication traces as originally received, simulating the original instruments as they are. This can be done in order to evaluate changes; analyze/debug abnormal situations; performance testing and fine tuning other components of the system, in accordance with one embodiment of the present invention.
Figure 8B:
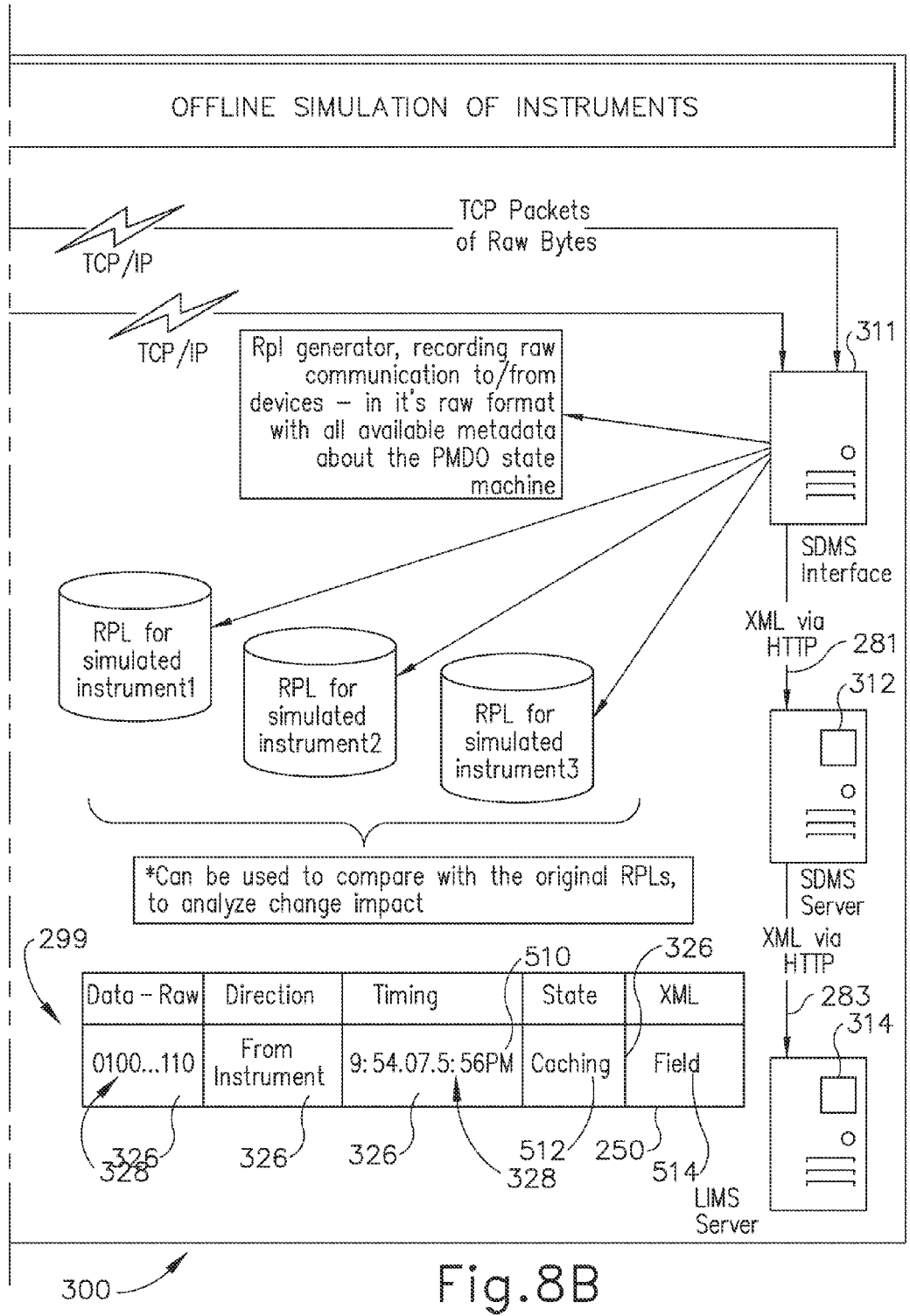
Figure 9:
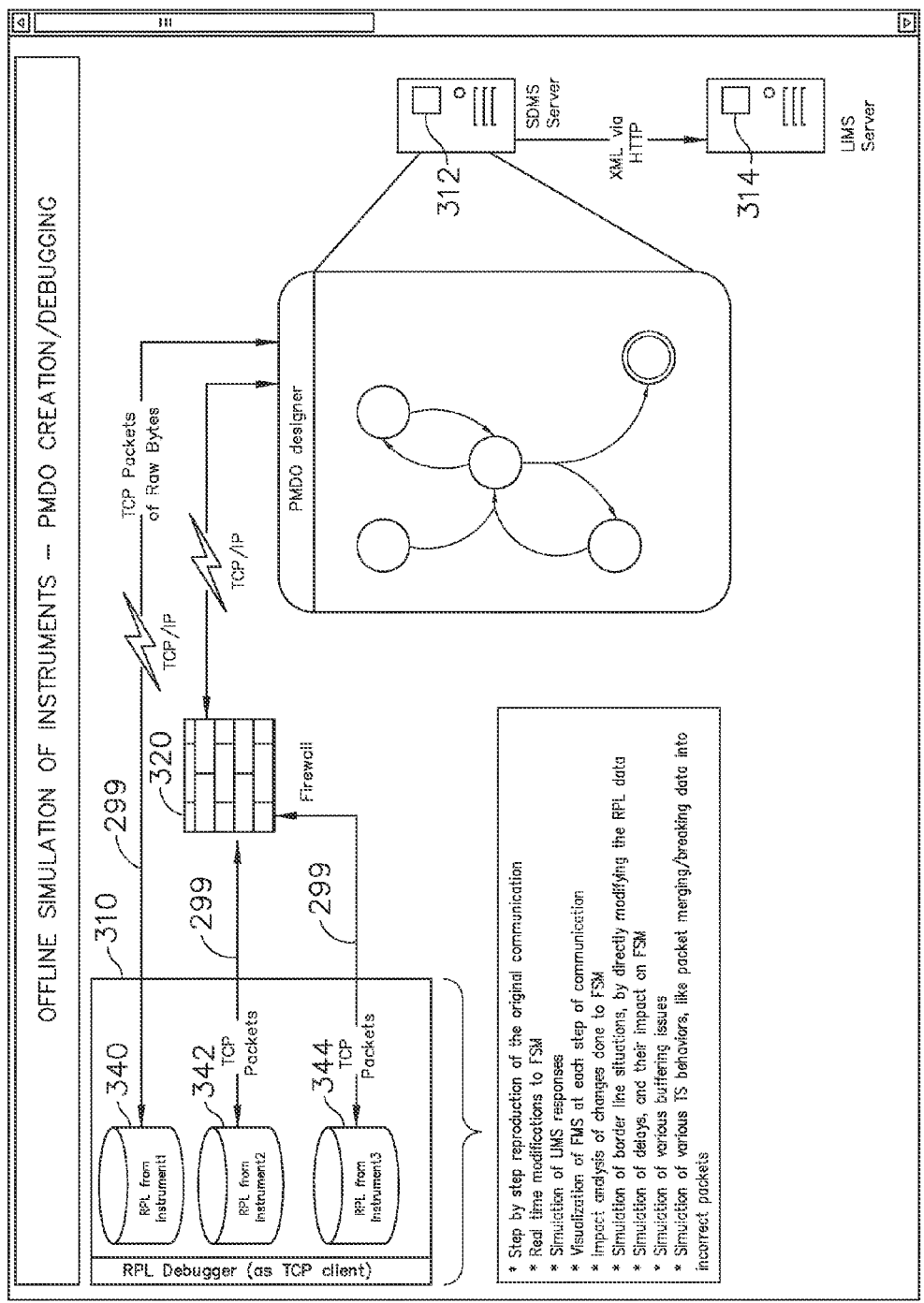
FIG. 9 depicts a potential connection diagram of various components of the system, configured towards the communication driver (FSM/Message layer) debugging/development, in accordance with one embodiment of the present invention.

With reference to FIGS. 8A and 8B, once a transmission 298 is captured and a captured transmission 299 is formed, the captured transmission 299, which contains replay data, may be replayed in order to simulate a transmission 298 from an instrument 304. The captured transmission 299 may be used in simulations of transmissions 298 between an instrument 304 and a remote server 240, such as the SDMS Server 312 which runs the connectivity driver 218. The captured transmissions 299, not only include transmissions 301, 302, 303 from instruments 304, 306, and 308, but the captured transmissions 299 may also be transmissions 281, 283 to and from the replay generator 310, the SDMS server 312, and the LIMS server 314. As a result, all the transmissions 298 to and from the instruments 304, 306, and 308, and the transmissions to and from the replay generator 310, the SDMS server 312, and the LIMS server 314 may be captured, and placed into fields including RAW data as well as generated data, as described above.

By capturing transmissions 298 to and from the instruments 304, 306, and 308, simulations can be performed to troubleshoot communication issues between the instruments 304, 306, 308 and other components in the system 300, such as the SDMS server 312 and the LIMS server 314, without needing the instruments 304, 306, and 308, as the captured transmissions 299 contain enough information as to simulate communications to and from the instruments 304, 306, 308.

Furthermore, once captured, before the captured transmission 299 is replayed, the captured RAW data and generated data in the captured transmission 299 may be altered by a user. For example, time delays may be inserted between portions of RAW data, such as packets or bytes. In fact, any data in the discrete fields 326 of information 328 may be altered, including the RAW data itself, the timing of the data, the direction that the transmission 301 was transmitted in (i.e. from the instrument 304, 306, 308 to the replay generator 310 or vice versa), the state of the connectivity driver 218 at the time the transmission 301 is received by the replay generator 310, any parsed data, such as XML information found in the transmission 301. Altering the captured transmission 299 may be helpful in troubleshooting communication issues between the instruments 304, 306, and 308, and the replay generator 310, the SDMS server 312, and the LIMS server 314, including, but not limited to, issues with the connectivity driver 218.

With reference to FIGS. 8A and 8B, the captured transmission 299 is able to accurately reproduce the original transmission 298, so that the replaying of the transmission 299 is nearly identical to the original transmission 298. Captured transmission 299 is preferably replayed using the replay generator 310, which is a computer. During playback, a user may select only portions of the captured transmission 299 for playback. Additionally, each portion of the captured transmission 299, that is each packet or byte of data, may be played back packet by packet or byte by byte, so as to allow for a step-by-step playback of the transmission 310. As discussed above, any data within the captured transmission 299, including any RAW or generated data, may be manipulated or changed in order to simulate potential issues and evaluate FSM (The connectivity driver finite state machine status) behavior. The playback of the captured transmission 299 allows for simulation of communications issues (i.e. checksum errors and improper instrument replies) between components, such as instruments 304, 306, 308, and computers including the replay generator 310, the SDMS server 312, and the LIMS server 314. Breakpoints may be added in the replayed captured transmission 299 for more convenient debugging and development. Additionally, replaying the captured transmission 299 or parts of it would help troubleshoot any break on data mismatch (i.e. a change in LIMS reply or debugging of the handlers). Also, replaying the captured transmission 299 would help in performance evaluations, such as by allowing for the manual reduction of timing for simulated data. Finally, the replaying the captured transmission 299 is useful for smoke testing. In computer programming and software testing, smoke testing is preliminary testing to reveal simple failures severe enough to reject a prospective software release. In this case, the smoke is metaphorical. A subset of test cases that cover the most important functionality of a component or system are selected and run, to ascertain if the most crucial functions of a program work correctly. For example, a smoke test may ask basic questions like "Does the program run?", "Does it open a window?", or "Does clicking the main button do anything?" The purpose is to determine whether the application is so badly broken that further testing is unnecessary. Smoke testing performed on a particular build is also known as a build verification test.

Figure 10:
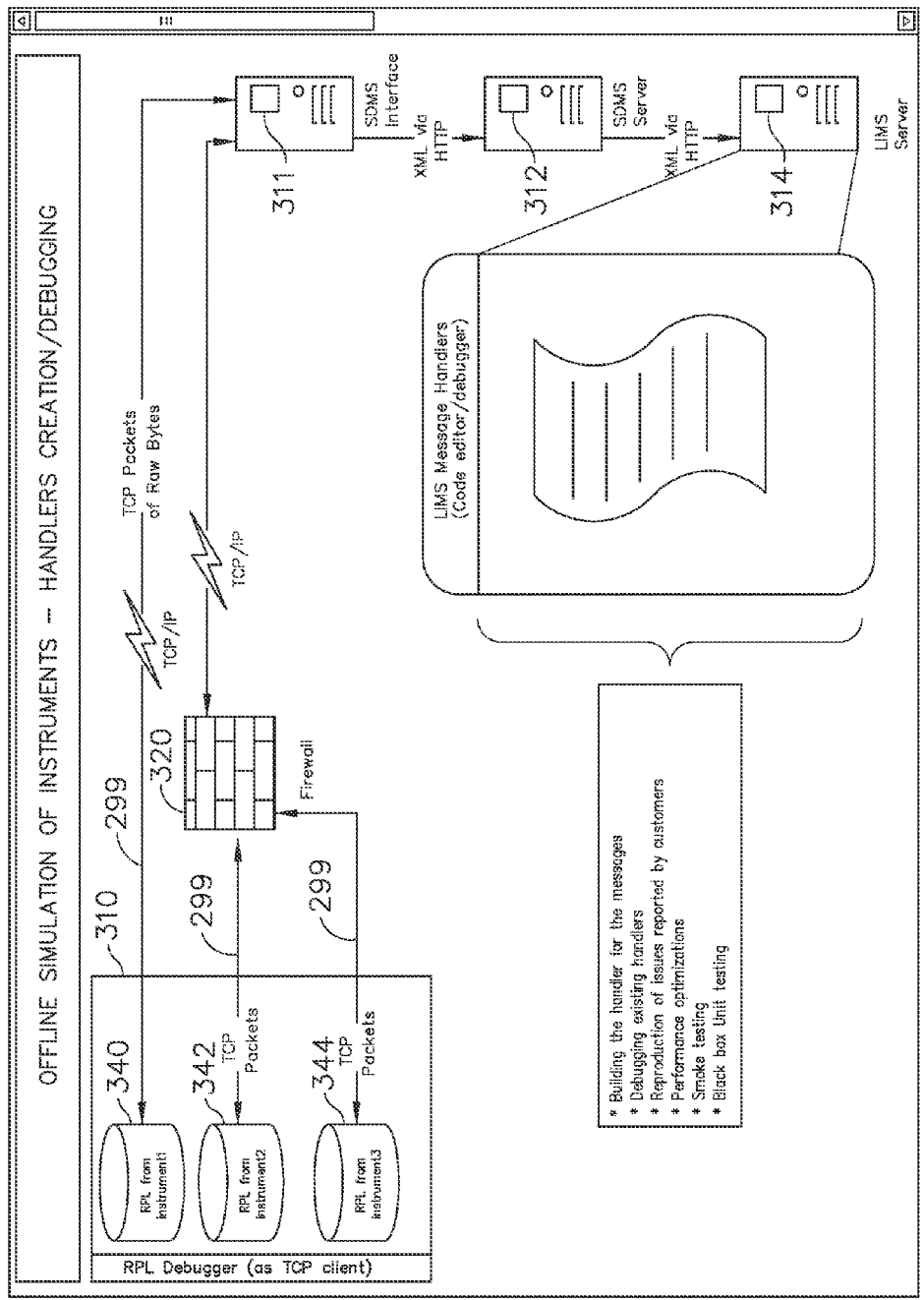
FIG. 10 depicts a potential connection diagram of various components of the system, configured towards development/debugging/fine tuning the business logic layer (LIS/LIMS part) of the communication driver, in accordance with one embodiment of the present invention.

With reference to FIG. 10, in one embodiment, the captured transmission may be replayed to the SDMS server 312. The replaying of the captured transmission 299 to the SDMS server 312 may be useful in troubleshooting and improving portions of the software running on the SDMS server 312, such as the connectivity driver 218. For example, the replaying of the captured transmission 299 to the SDMS server 312 may be useful in debugging and creation of a connectivity driver 218, either by traditional programming, or by using graphical programming means, as described in U.S. Patent Publication No. 2012/0174060 entitled "GRAPHICALLY BASED METHOD FOR DEVELOPING CONNECTIVITY DRIVERS," the contents of which are hereby incorporated by reference. The replaying of the captured transmission 299 to the SDMS server 312 would allow for a step by step reproduction of the original transmission 298, real time modifications to FSM (The connectivity driver and the finite state machine that drives it), simulation of LIMS responses, visualization of FSM at each step of communication, impact analysis of changes done to FSM, simulation of border line situations, by directly modifying the RPL data, simulation of delays, and their impact on FSM, simulation of various buffering issues, simulation of various TS (Terminal servers, that convert between different signal types) behaviors, like packet merging/breaking data into incorrect packets. In this embodiment, the captured transmission 299 is replayed by the replay generator 310 to the SDMS server 312, wherein the connectivity driver 218 resides, and preferably, wherein software for creating and debugging the connectivity driver 218 also resides. By playing back the captured transmission 299 to a computer where software for creating and debugging the connectivity driver 218 resides, the connectivity driver may be created and debugged without having to have an instrument 304, 306, 308 present.

With reference to FIG. 10, in one embodiment, the captured transmission 299 may be replayed to the LIMS server 314. The replaying of the captured transmission 299 to the LIMS server 314 may be useful in troubleshooting and improving portions of the LIMS software running on the LIMS server 314, such as the LIMS Message Handlers. For example, the LIMS Message Handlers (The business logic layer that processes the received and translated messages, and replies to them if necessary) may be debugged by replaying the captured transmission 299 to the LIMS server 314. The replaying of the captured transmission 299 to the LIMS server 314 would assist in the process of building a handler for LIMS messages, debugging existing handlers for LIMS messages, reproduction of issues reported by users of the LIMS software running on the LIMS server 314, such as customers, performance optimizations of the LIMS software, smoke testing of the LIMS software, and black box and unit testing of the LIMS software.

Figure 6:
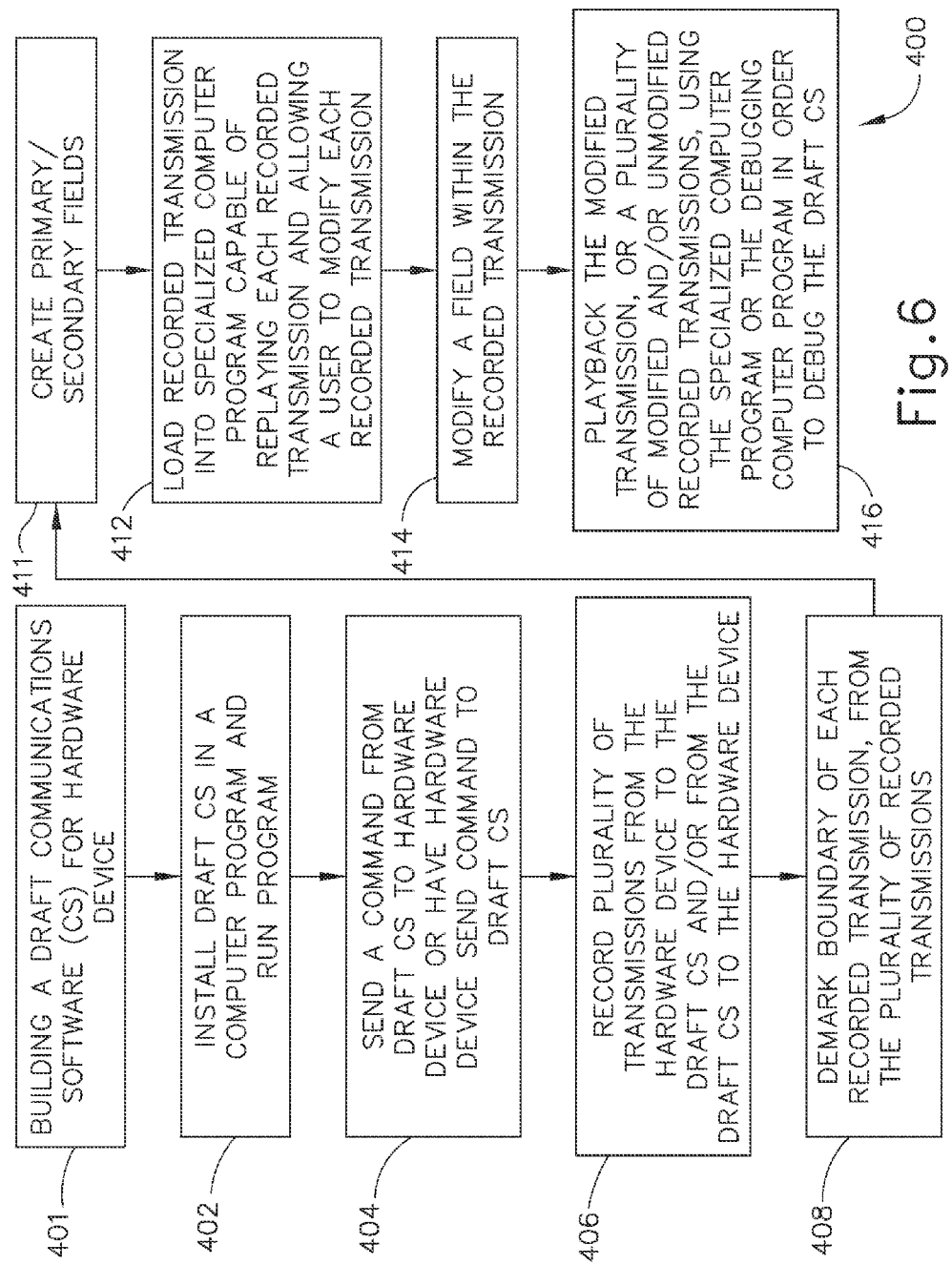
FIG. 6 depicts a flowchart illustration of methods, apparatus (systems) and computer program products, in accordance with one embodiment of the present invention.

With reference to FIG. 6, is a flowchart representation of a method 400 for developing and testing communications software which generates and receives transmissions to and from devices. Communications software is any software which generates and receives transmissions to and from hardware devices 200, such as instruments or computers, and includes things such as drivers (i.e. a connectivity driver 218) or message handlers (i.e. a LIMS message handler). Method 400 is initiated at block 401 by building a draft communications software for hardware device 200. The draft communications software may be built either by having a software engineer write program code for a computer program from which the draft communications software is to be executed on, or may be graphically developed by a user using a graphical interface, such as that described by U.S. Patent Publication No. US 2012/0174060, entitled "GRAPHICALLY BASED METHOD FOR DEVELOPING CONNECTIVITY DRIVERS," the contents of which are incorporated herein by reference.

Figure 4:
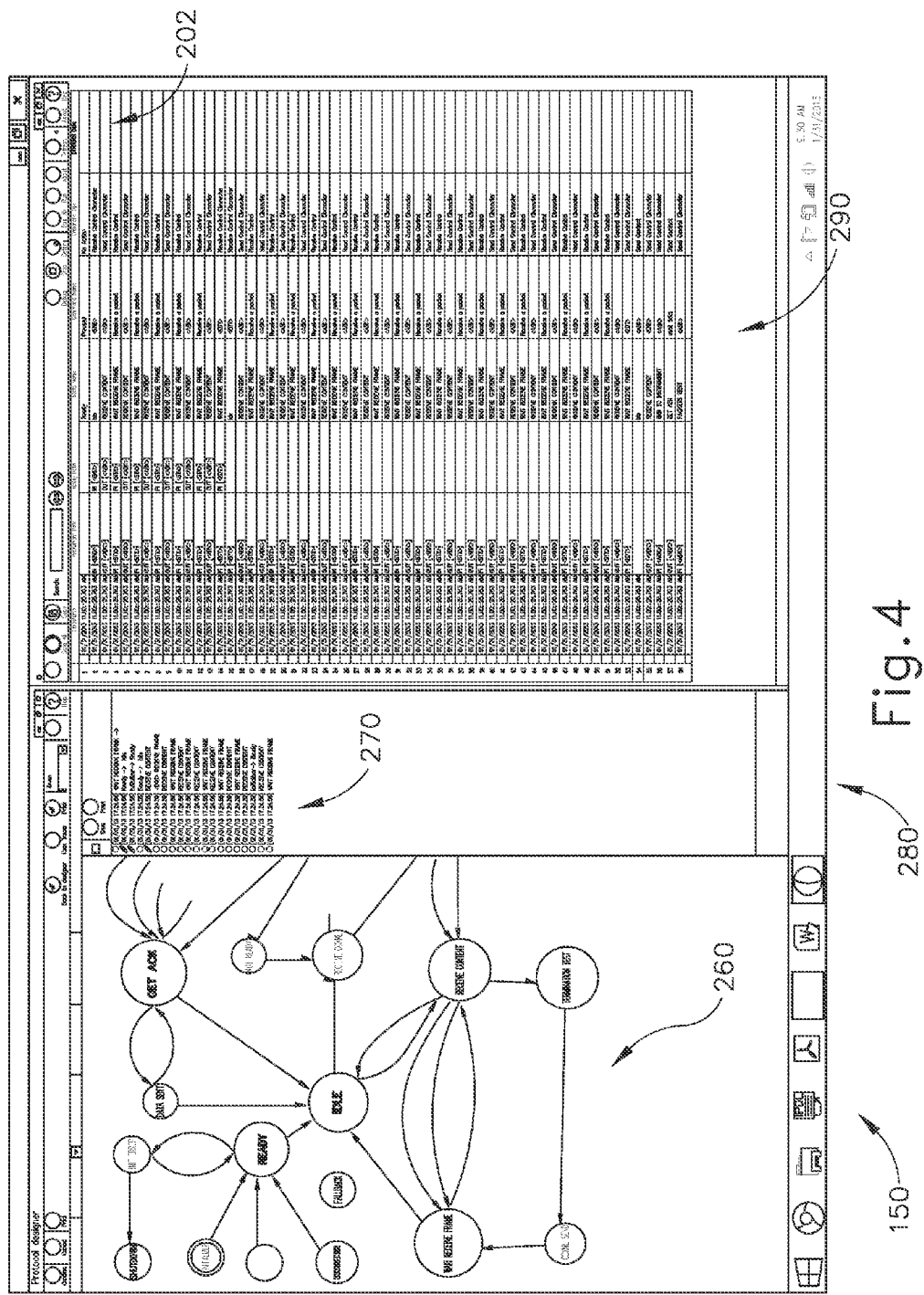
FIGS. 4-5 depict various states of a simulation used to debug a connectivity driver, in accordance with one embodiment of the present invention.
Figure 5:
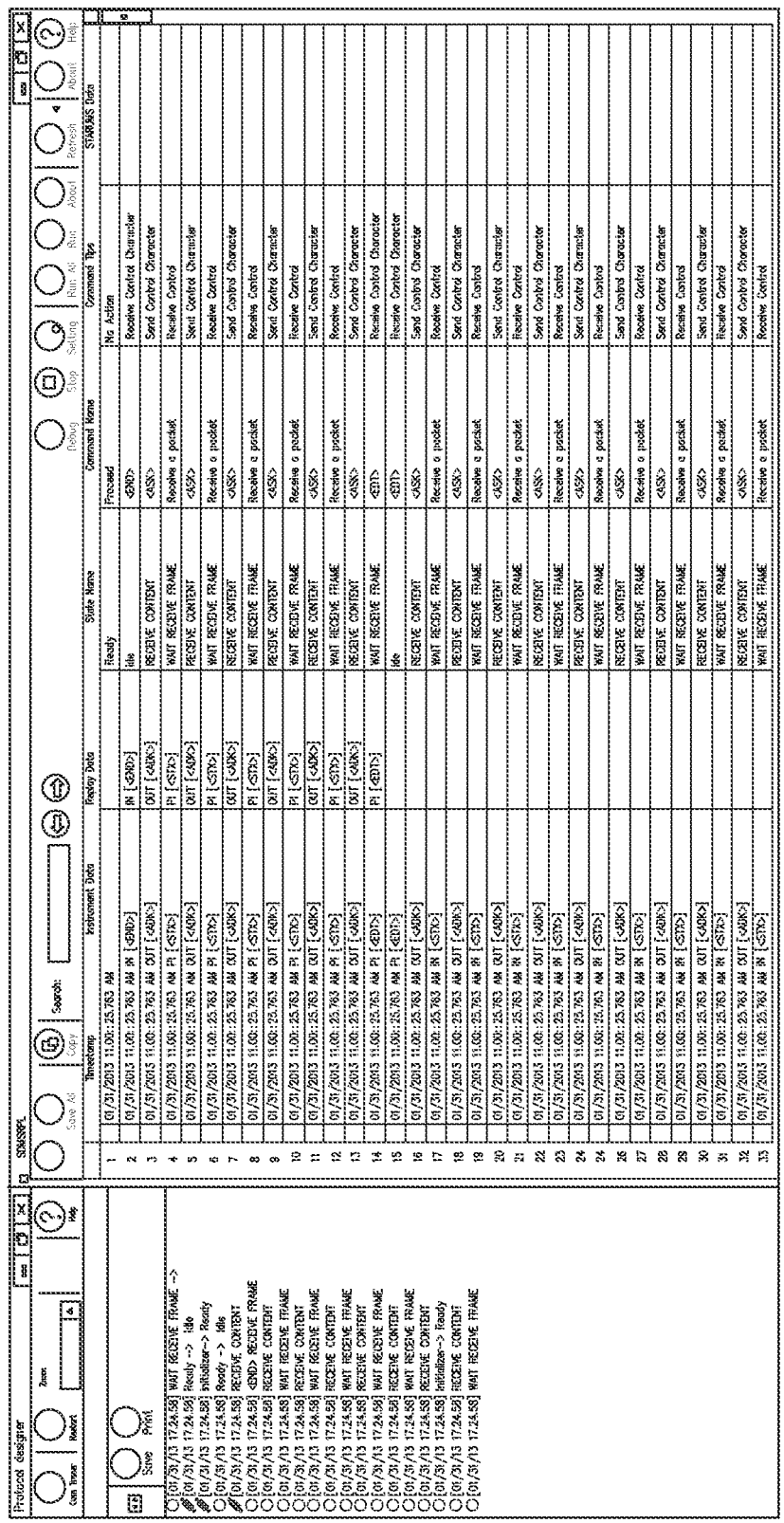

Once built, the method 400 moves to block 402, wherein the built draft communications software is installed in a computer program 150, such as a LIMS software application 400 within the computer 100, and the computer program 150 is launched along with the draft communications software. Alternatively, the draft communications software is installed in a debugging computer program 150 which is built exclusively to debug and test programs such as the draft communications software, as shown in FIGS. 4 and 5.

At block 404, upon loading the draft communications software into a computer program 150, the draft communications software is either told to send a command to the hardware device 200 or the hardware device 200 is turned on and is told to, or automatically, begins to send commands to the draft communications software.

Once commands are being sent either by the draft communications software to the hardware device 200 or from the hardware device 200 to the draft communications software, the method 400 moves to block 406, wherein a plurality of transmissions 298 from the hardware device 200 to the draft communications software and/or from the draft communications software to the hardware device 200 are recorded into a computer readable memory medium. The plurality of transmissions 298 may be generated automatically by the hardware device 200 or the draft communications software, or they may be generated manually via a user prompting either the hardware device 200 or the draft communications software.

Once a sufficient number of transmission 298 are recorded, then the recording is stopped. Moving to block 408, either upon or during the recording of the transmissions 298 in block 406, a boundary of each recorded transmission 298, from the plurality of recorded transmissions 298, is demarked, either manually by a user or automatically by a computer program. At block 411, primary and secondary fields are created, whereby each demarked boundary of the transmission 298 is copied into a primary field as RAW data and generated data is placed in the secondary field associated with primary field. The secondary fields may be any one of a number of fields in which information in each recorded transmission 299 may be related to, such as, a time 252 that the transmission 298 was transmitted at, a direction 254 the transmission 298 was transmitted in, a content 256 of the transmission 298, and a state 258 of the communications software during which the transmission 298 is received. Each one of the fields contains information which is received by the draft connectivity driver 228 and which may cause the draft connectivity driver 228 to move from one state to another state, or cause the draft connectivity driver 228 to issue a response. In one embodiment, the raw data in each recorded transmission 299 is further parsed into a plurality of discrete fields containing parsed data, such as XML data, making it easier for a user to understand the meaning and function of each portion of the transmission 298.

Moving to block 412, once the data in each transmission 298 is placed in fields, and the recorded transmission 299 is generated, the recorded transmission 299 is then loaded into a specialized computer program 152 which is capable of replaying each recorded transmission 299 and allowing a user to modify each recorded transmission 299. Preferably, the specialized computer program 152 is connected with a debugging computer program 154. Preferably, the draft communications software is loaded into the debugging computer program 154. Preferably, the specialized computer program 152 is able to send each recorded transmission 299 to the debugging computer program 154 and receive commands generated by the draft computer software loaded in the debugging computer program 154, from the debugging computer program 154.

Moving to block 414, a user, such as a software engineer, may then modify any field within the recorded transmission 299, such as the time that the transmission 298 was transmitted at, the direction the transmission 298 was transmitted in, and the content of the transmission 298 in order to form a modified transmission. Upon modifying a field, the modified transmission, or a plurality of modified and/or unmodified recorded transmission are then played back using the specialized computer program 152 or the debugging computer program 154, at block 416, in order to debug the draft communications software. Preferably the transmissions 299 are played back from the computer readable memory medium. In this manner, the draft communications software can be debugged by sending a variety of recorded and modified transmissions to the debugging computer program 154, and the user can continue to test various scenarios onto the draft communications software without having to have the hardware device 200 actually connected to the communications software or the debugging computer program 154.

For example, in one embodiment, a user may modify the timing or order that the recorded transmissions 299 are played back at. In another embodiment, a user may modify the direction the transmission 298 was sent in (i.e. from the hardware device 200 to the draft communications software, or from the draft communications software to the hardware device 200). In yet another embodiment, a user may modify the content of the recorded transmission 299. As modified or recorded transmissions 299 are sent to the debugging computer program 154, the draft communications software may move from one state to another, or it may issue a response back to the specialized computer program 152. Additionally, if the draft communications software issues an error, locks up, or does not behave as predicted, then the user may modify and fix the draft communications software so that the error is fixed or the behavior is made to be as predicted.

With reference to FIGS. 4 and 5, in one embodiment, the operation of the communications software, such as the connectivity driver 218, may be simulated by running a simulation 280 using a graphical diagram 260 and playing back prerecorded transmissions 290 from the hardware device 200. The prerecorded transmissions 290, which include hardware messages 202 from hardware device 200, may be modified in some manner by the user and played back in order to simulate various scenarios to the connectivity driver 218 in an attempt to debug the connectivity driver 218. With reference to FIG. 4, hardware state information recorded in the recorded transmissions 299 is provided to the driver development module 230 and logged in a window 270. As each discrete piece of hardware state information is provided to the driver development module 230, the current state of the connectivity driver 218 is illustrated by highlighting within the graphical diagram 260 the respective state node representing the current state. As additional discrete pieces of hardware state information is provided to the driver development module 230, the current state is constantly illustrated by highlighting within the graphical diagram 260 the respective state node representing the current state. Any state for which no state node is provided or any error in the graphical diagram 260 will become apparent upon running the simulation 280.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats.

However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A processor-implemented method for developing and testing communications software which communicates with an instrument and a computer system or application in operative communication with the instrument, the method comprising:
building communications software for the instrument;
recording a plurality of data transmissions from the instrument to the computer system or application and storing the plurality of data transmissions into a computer readable memory medium;
demarking the boundary of each recorded data transmission in the plurality of recorded transmissions;
identifying raw data from each recorded data transmission and parsing the raw data to form parsed data;
determining for each demarked recorded data transmission a time that the data transmission was transmitted at, a direction the data transmission was transmitted in, a content of the transmission, and the parsed raw data corresponding to the data transmission;
modifying one of the time that the transmission was transmitted at, the direction the transmission was transmitted in, and the content of the transmission in order to form a modified transmission; and
playing back the modified transmission from the computer readable memory medium to debug the communications software without connection between the instrument and the computer system or application.

2. The method of claim 1, wherein upon playing back the modified transmission, the communications software is modified based upon an observation made during the playing back, and a modified communications software is built.

3. The method of claim 1, further comprising modifying a playback order of the recorded transmissions and then playing the recorded transmission with the modified playback order.

4. The method of claim 1 wherein the communications software is one of a driver or a message handler.

5. The method of claim 1, wherein the discrete fields contains a first plurality of discrete data fields within each recorded transmission.

6. A computer readable memory comprising program instructions for developing and testing a connectivity driver for an instrument, wherein the program instructions are executable by a processor to:
record a plurality of data transmissions between the instrument and a computer system or application in operative communication with the instrument;
identify raw data from each recorded data transmission and parse the raw data to form parsed data;
place the raw data from each recorded data transmission into a primary field of the recorded data transmission;
generate a plurality of secondary fields in the recorded data transmission associated with the primary field, the secondary field including the parsed data and at least one of: a time that the transmission was transmitted at, a direction the transmission was transmitted in, a content of the transmission, and a state of the connectivity driver during the transmission;
modify the content of the first or secondary fields; and
play the modified transmission from computer readable memory to debug communications software in the connectivity driver without connection to the instrument.

7. The computer readable memory of claim 6, wherein the program instructions are executable by a processor to modify the connectivity driver based upon an observation made during the playing back and build a modified connectivity driver.

8. The computer readable memory of claim 6, wherein the computer program instructions form a middleware program, a laboratory information system (LIS) program, or a laboratory information management system (LIMS) program.

9. The computer readable memory of claim 6 further comprising program instructions executable by a processor to allow a user modify the playback order of the recorded transmissions.

10. The computer readable memory of claim 6 further comprising program instructions executable by a processor to simulate operation of the connectivity driver using a graphical diagram.

11. The computer readable memory of claim 6, wherein the discrete fields contains a first plurality of discrete data fields within each recorded transmission.

12. The computer readable memory of claim 11 further comprising program instructions executable by a processor to allow a user to modify any one of the plurality of discrete fields and/or the order of the discrete fields, and playback the modified discrete fields to the device driver.

13. A laboratory information management system including a module for debugging a connectivity driver, the connectivity driver operatively coupled between an instrument and the laboratory information management system, the system comprising:
 a computer readable memory medium; and
 at least one processor operable to access from the computer readable memory medium program instructions executable by the processor to:
  record a plurality of data transmissions from the instrument to the laboratory information management system;
  demark the boundary of each recorded data transmission in the plurality of recorded transmissions;
  generate a primary field for holding raw data from each recorded transmission and generate a secondary field associated with the primary field, wherein the secondary field includes a time that the transmission was transmitted at, a direction the transmission was transmitted in, a content of the transmission, and a state of the draft connectivity driver that the transmission places cause the draft connectivity driver to be in;
  parse the raw data to form parsed data and store the parsed data in the secondary field;
  allow a user to modify one of: the time that the recorded transmission was transmitted at, the direction the recorded transmission was transmitted in, and the content of the recorded transmission in order to form a modified transmission; and
  playback the modified transmission from computer readable memory medium in order to debug the connectivity driver without connection between the instrument and the laboratory information management system.

14. The system of claim 13, wherein the at least one processor is operable to access from the computer readable memory medium program instructions executable by the processor to modify the connectivity driver based upon an observation made during the playing back and build a modified connectivity driver.

15. The system of claim 13, wherein the program instructions form a middleware program, a laboratory information system (LIS) program, or a laboratory information management system (LIMS) program.

16. The system of claim 13, wherein the at least one processor is operable to access from the computer readable memory medium program instructions executable by the processor to allow a user modify the playback order of the recorded transmissions.

17. The system of claim 13, wherein the at least one processor is operable to access from the computer readable memory medium program instructions executable by the processor to simulate operation of the connectivity driver using a graphical diagram.

18. The system of claim 13, wherein the discrete fields contains a first plurality of discrete data fields within each recorded transmission.

19. The system of claim 13, wherein the at least one processor is operable to access from the computer readable memory medium program instructions executable by the processor to allow a user to modify any one of the plurality of discrete fields and/or the order of the discrete fields, and playback the modified discrete fields to the device driver.

20. A computer readable memory comprising program instructions for developing and testing draft communications software which generates and receives transmissions between a hardware device and a computer system or application in operative communication with the hardware device, wherein the program instructions are executable by a processor to:
 record a plurality of data transmissions to or from the hardware device;
 identify raw data from each recorded data transmission and parse the raw data to form parsed data;
 place the raw data from each demarked recorded data transmission into a primary field of the recorded data transmission;
 generate a plurality of secondary fields in the recorded data transmission associated with the primary field, the secondary field including the parsed data and at least one of: a time that the transmission was transmitted at, a direction the transmission was transmitted in, a content of the transmission, and a state of the draft communications software during the transmission;
 modify the content of the first or secondary fields; and
 play the modified transmission from computer readable memory medium in order to debug the draft communications software without connection to the hardware device.

* * * * *